United States Patent [19]
Boerema et al.

[11] Patent Number: 4,670,819
[45] Date of Patent: Jun. 2, 1987

[54] INTERIOR VEHICLE LIGHT

[75] Inventors: Edward T. Boerema, Zeeland; Carl W. Flowerday; Dennis J. Fleming, both of Holland, all of Mich.

[73] Assignee: Prince Corporation, Holland, Mich.

[21] Appl. No.: 762,788

[22] Filed: Aug. 6, 1985

[51] Int. Cl.⁴ .............................................. B60Q 3/02
[52] U.S. Cl. .................:...................... 362/80; 362/247
[58] Field of Search ................... 362/61, 80, 247, 248, 362/219, 223

[56] References Cited

U.S. PATENT DOCUMENTS

| | | |
|---|---|---|
| 1,137,091 | 4/1915 | Sclafani . |
| 1,530,345 | 3/1925 | Benson .............................. 362/61 X |
| 1,673,647 | 4/1925 | Strang . |
| 1,921,290 | 4/1929 | Gragg et al. . |
| 1,955,916 | 9/1932 | Irminger . |
| 2,575,211 | 11/1951 | Flacke .................................. 362/80 |
| 3,452,190 | 12/1965 | Senseman . |
| 4,202,030 | 5/1980 | Kimura . |
| 4,310,871 | 1/1982 | Adachi . |
| 4,449,167 | 5/1984 | Cohen . |

FOREIGN PATENT DOCUMENTS

| | | | |
|---|---|---|---|
| 935833 | 12/1955 | Fed. Rep. of Germany | ........ 362/80 |
| 1030702 | 5/1958 | Fed. Rep. of Germany | ........ 362/80 |
| 1046268 | 7/1953 | France | ................................. 362/80 |
| 1144773 | 4/1957 | France | ................................. 362/80 |
| 1518902 | 2/1968 | France . | |
| 1037050 | 7/1966 | United Kingdom . | |

*Primary Examiner*—Samuel Scott
*Assistant Examiner*—Allen J. Flanigan
*Attorney, Agent, or Firm*—Price, Heneveld, Cooper, DeWitt & Litton

[57] ABSTRACT

An indirect interior vehicle light preferably located along the top edge of each of the forward vehicle doors which directs low level light downwardly and below the eye level of the vehicle occupants. The system includes an elongated generally L-shaped housing defining a light shield. The housing includes one wall which extends generally downwardly and defines a downwardly facing light transmissive window.

16 Claims, 5 Drawing Figures

INTERIOR VEHICLE LIGHT

BACKGROUND OF THE INVENTION

The present invention relates to an illumination system for the interior of a vehicle.

Typically, the interior of a vehicle is illuminated only when the doors of the vehicle are open to actuate courtesy lights located either near the floor of the vehicle for ingress and egress or overhead or dome lights for providing temporary illumination for the vehicle. Such lights also typically can be operated by a manual switch, usually associated with the head lamp switch. Although such lighting adequately illuminates the interior of a vehicle, the light is usually of a level excessive for normal vehicle operation at night and is only used on a temporary basis. Specially adapted map reading lights have been provided which focus light away from the driver's eyes and yet allow illumination of the lap area of passengers, for example, such that maps or other reading material can be viewed with a minimum of distraction to the driver. U.S. Pat. No. 4,241,870, discloses a housing including such an overhead focused interior light system.

Many vehicles include several electrical control switches typically located in the door armrest of the operator or passenger, such controls including electric window control switches, rearview mirror remote control switches and/or electric seat adjustment switches. When operating the vehicle at night, it is somewhat difficult to utilize such switches, inasmuch as they typically are not illuminated and, therefore, it is either necessary to momentarily turn on the overhead lights of the vehicle or experiment with several switches before the correct one is reached and manipulated. Further, when operating the vehicle at night it is frequently difficult to find other controls or objects located within the vehicle due to the low light intensity provided typically by only the vehicle instrument displays.

SUMMARY OF THE PRESENT INVENTION

The system of the present invention provides an indirect interior vehicle light preferably located along the top edge of each of the forward vehicle doors for directing low level light downwardly and below the eye level of the vehicle occupants. Such illumination provides a low level of illumination suitable for illuminating control switches located on the door's armrest and also provide a low level of illumination and ambiance generally to the interior of the vehicle which is not distracting to the vehicle operator. By integrating the indirect lighting system into the door, the illumination means is provided without detracting from the general esthetic appearance of the vehicle interior.

Lighting systems incorporating the present invention provide an illuminated door panel for a vehicle which includes an elongated generally L-shaped housing defining a light shield. The housing includes one wall which extends generally downwardly and defines a downwardly facing light transmissive window. Means are also provided for securing the panel along the top edge of the vehicle door such that the light therefrom illuminates the sides of the door below the eye level of the vehicle occupants. These and other features, objects and advantages of the present invention can best be understood by reference to the following description, together with the accompanying drawings in which:

DETAILED DESCRIPTION OF THE PREFERRED EMBODIMENT

Figure 1:
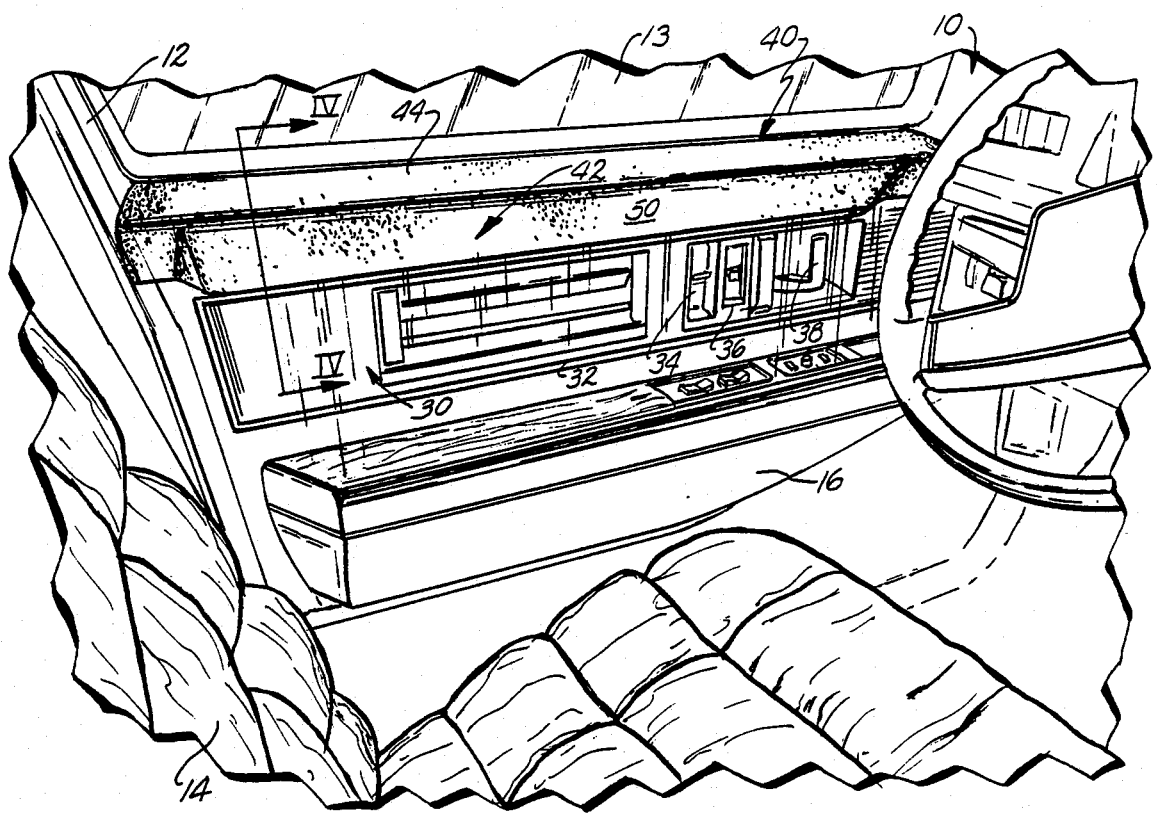
FIG. 1 is a fragmentary perspective view of a vehicle including the illumination means of the present invention.
Figure 2:
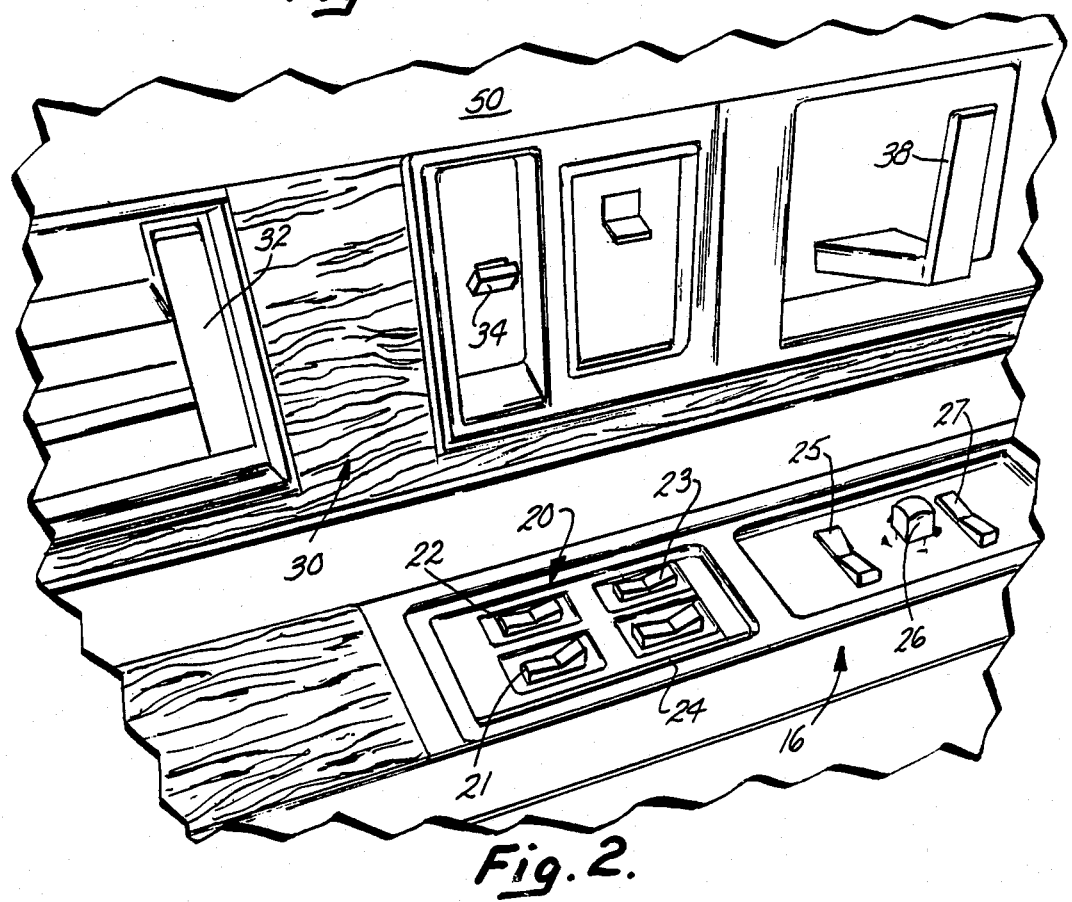
FIG. 2 is an enlarged fragmentary perspective view of the structure shown in FIG. 1.
Figure 3:
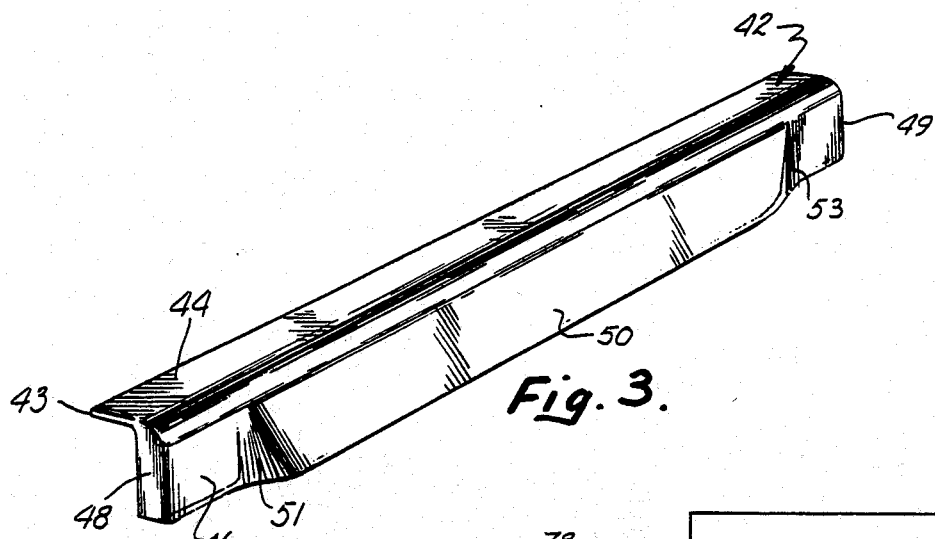
FIG. 3 is a perspective view of the housing embodying the present invention.
Figure 4:
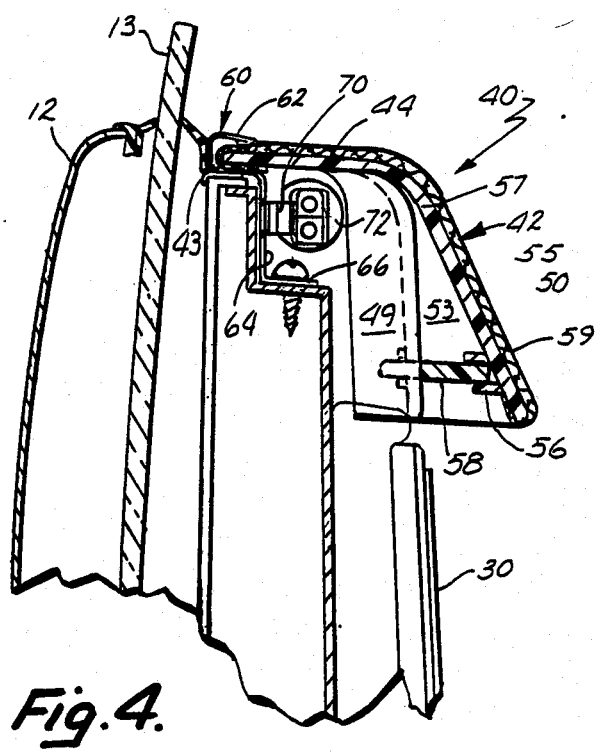
FIG. 4 is an enlarged cross-fragmentary cross-sectional view taken along Section lines IV—IV in FIG. 1.

Referring initially to FIGS. 1 and 2, there is shown the front driver's seat area of a vehicle 10 which includes a driver's side door 12 and a driver's seat 14 adjacent thereto. The door includes an armrest 16 which includes several control switches, such as switch bank 20 including four switches 21-24 (FIG. 2), for actuating each of the power windows including window 13 mounted within the driver's door 12. The armrest also includes a series of control switches 25-27 for controlling the position of the driver's seat. Above armrest 16 there extends a door panel 30 which includes a door closing handle 32, a manual door-locking lever 34, an electrically operated door locking-switch 36 and a manual door opening lever 38. In a conventional vehicle, above panel 30 there is typically provided a door molding at the interface of the window and upper edge of the door. With the present invention, the normal door molding is replaced with the indirect illuminated vehicle light assembly 40 of the present invention the construction of which is best seen in FIGS. 3 and 4.

System 40 includes a generally inverted L-shaped housing 42 having an upper generally horizontal wall 44 and a generally downwardly depending wall 46 with suitable inwardly projecting end walls 48 and 49 to conform to the edges of the door. The external surface of housing 42 may be covered with an upholstery material 59 (FIG. 4), flocking or painted to conform the housing to the appearance of the vehicle. The downwardly depending wall 46 of housing 42 includes an integral outwardly projecting lip 50 which defines a light transmissive window 52 (FIG. 4) which extends outwardly from door panel 30 to project light downwardly toward the upper surface of armrest 16 as well as the surface of panel 30. Lip 50 extends downwardly and outwardly at an angle of about 30 degrees from the vertical such that the width of light transmissive window 52, at its lower end, projects outwardly from panel 30 a distance of about one inch in the preferred embodiment and, therefore, is relatively unobtrusive and yet provides a relatively elongated rectangular surface area from which illumination is projected into the lower interior of the vehicle.

In the preferred embodiment of the invention, the sides 51 and 53 of projection 50 and the interior of the projection integrally includes channel means defined by a pair of spaced elongated bosses 55 and 56 for supporting therein a light transmissive planar cover 58. The interior surface 57 of housing 42 is coated with a light reflective material such as white or aluminum paint, such that illumination is reflected downwardly through the window 52. Housing 42 and window panel 58 are molded of a suitable polymeric material such as polycarbonate. The upholstery fabric 59, as shown in FIG. 4, can be a foamed back upholstery to provide a cushioned texture to the housing 42, if desired.

The housing is secured to the doorframe 11 (Fig. 4) by, preferably, an extruded elongated clip 60 (FIG. 4) or a plurality of separate clips which include a U-shaped upper end 62 for compressably receiving and holding the edge 43 of housing 42 and which is configured to conform to the upper portion of the doorframe. Thus, in the preferred embodiment illustrated in FIG. 4, clip 60 has a downwardly depending leg 64 and a horizontally extending mounting ledge 66 such that the clip 60 can be secured to the horizontal ledge defined by the doorframe 11 by suitable fastening means such as sheetmetal screws 68.

Mounted to the clip at spaced locations therealong are a plurality of lamp sockets 70 in which are mounted electrical lamps 72 having a candlepower of about 6 for providing even illumination outwardly through window 52. In the preferred embodiment, as illustrated in FIG. 5, three equally spaced lamps 72 are provided and light therefrom is reflected from the inner generally concave reflective surface 57 of the housing 42 downwardly through transparent member 58 and through the window 52 defined by housing 42.

Figure 5:
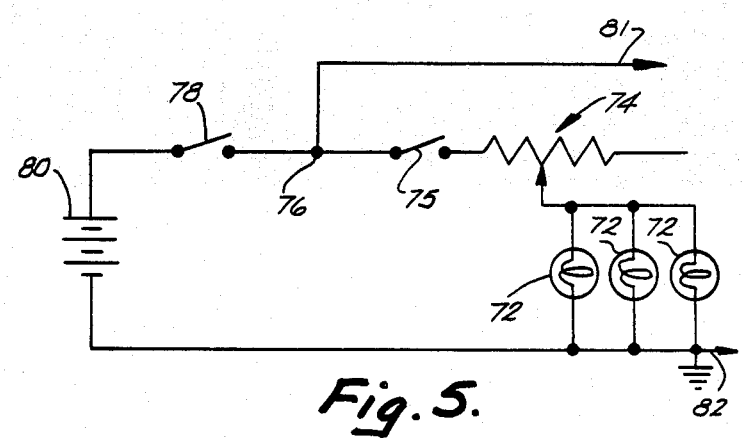
FIG. 5 is an electrical circuit diagram in schematic form of the electrical circuit of the present invention.

Referring now to FIG. 5, the electrical circuit for the system includes three lamps 72 which are coupled in parallel, the combination being coupled in series with a light dimming rheostat 74 through a series connected switch 75 to a junction node 76. Junction 76 is coupled to the vehicle's electrical system such as battery 80 through a light on/off switch 78 through a conventional wiring harness. The electrical conductors intercoupling the lamps 72 are positioned within the housing 42 in the area adjacent and above mounting tab 66 and can be held therein by suitable wire ties or the like. Rheostat 74 and switch 75 can be remotely positioned such as on the dashboard or within the door panel 30 as desired. Conductors 81 and 82 from the circuitry shown in FIG. 5 extend to the vehicle's light system including the vehicle's instrument lights and the like. Switch 75 can be normally kept closed, if desired, such that whenever the vehicle's lights are turned on, the indirect illumination provided by interior light assembly 40 is continuously on and can be adjusted according to the setting desired by rheostat 74. Alternatively, switch 75 can be selectively opened as illustrated in FIG. 5 to disable the illumination if not desired.

The indirect illumination system 40, illustrated in FIG. 1, can be used on the driver and passenger sides of a two door vehicle and, if desired, on a four door vehicle, on each of the rear doors as well. With such installations, each of the lamps would be coupled through a rheostat 74 and switch 75 which would be controlled by the vehicle operator, such that they can be adjusted so that the desired level of illumination is provided. With the light to the side and below the driver, however, the illumination can be relatively high without causing any distraction to the driver's night vision. It will become apparent to those skilled in the art that various modifications to the preferred embodiment of the invention as described herein can be made without departing from the spirit or scope thereof as defined by the appended claims.

The embodiments of the invention in which an exclusive property or privilege is claimed are defined as follows:

1. An illuminated door panel for mounting to the upper portion of a vehicle door comprising:
   an elongated generally L-shaped housing defining a light shield, said housing including one wall which extends generally downwardly, said housing including a downwardly facing light transmissive window adjacent said one wall, said housing including a light reflective coating on its interior surface;
   lamp means positioned within said housing in a position laterally offset from said window for directing illumination reflected from said coating downwardly from said window; and
   means for securing said housing along an edge of a vehicle door such that light therefrom illuminates the sides of the door below the eye level of a vehicle occupant.

2. The apparatus as defined in claim 1, wherein said lamp means includes a plurality of spaced lamps to provide uniform illumination from said window along said housing.

3. The apparatus as defined in claim 1, wherein said panel further includes a transparent panel coupled to said housing for enclosing said window.

4. The apparatus as defined in claim 3, wherein said lamp means includes a plurality of spaced lamps to provide uniform illumination from said window along said housing.

5. The apparatus as defined in claim 1, wherein said one wall includes an outwardly flared section defining said window.

6. The apparatus as defined in claim 5, wherein said panel further includes a transparent panel coupled to said housing for enclosing said window.

7. The apparatus as defined in claim 6, wherein said lamp means includes a plurality of spaced lamps to provide uniform illumination from said window along said housing.

8. The apparatus as defined in claim 7, wherein said housing is covered with an upholstery material to conform said housing to the appearance of the interior of the vehicle in which it is installed.

9. An illuminated panel for mounting to the upper portion of a vehicle comprising:
   an elongated generally L-shaped housing defining a light shield, said housing including one wall which extends generally downwardly and includes an outwardly, downwardly facing formed flange, said housing including a light transmissive window adjacent said one wall, said housing including a light reflective coating on its interior surface;
   a plurality of spaced lamp means positioned within said housing in a position laterally offset from said window for directing illumination reflected from said coating downwardly from said window; and
   clip means for securing said housing along an edge of a vehicle such that light therefrom illuminates at least a portion of the vehicle and areas below and adjacent said housing and below the eye level of a vehicle occupant.

10. The apparatus as defined in claim 9, wherein said panel further includes a transparent panel coupled to said housing for enclosing said window.

11. The apparatus as defined in claim 10, wherein said housing is covered with an upholstery material to conform said housing to the appearance of the interior of the vehicle in which it is installed.

12. The apparatus as defined in claim 11, and further including lamp dimming means coupled to said lamps such that the illumination therefrom can be adjusted.

13. An illuminated door panel for mounting to the upper portion of an automobile door comprising:
   an elongated molded polymeric housing having a generally horizontal wall and an integral downwardly and outwardly extending wall defining a light shield, said housing including a downwardly facing light transmissive window adjacent said downwardly extending wall, said housing including a light reflective coating on its interior surface;
   said downwardly extending wall having channel means along at least a portion of its lower interior portion for supporting a planar sheet;
   a planar sheet of transparent material supported within said channel means to enclose said window;
   lamp means positioned within said housing in a position laterally offset from said window for directing illumination reflected from said coating downwardly from said window; and
   means for securing said housing along an edge of an automobile door such that light therefrom illuminates the sides of the door below the eye level of an occupant.

14. The apparatus as defined in claim 13, wherein said means for securing said housing comprises a clip secured to the automobile and having an opening for compressably receiving and holding an edge of said horizontally extending wall.

15. The apparatus as defined in claim 14, wherein said housing is covered with an upholstery material to conform said housing to the appearance of the interior of the vehicle in which it is installed.

16. The apparatus as defined in claim 15, and further including lamp dimming means coupled to said lamps such that the illumination therefrom can be adjusted.

* * * * *